Oct. 21, 1969          T. M. DAUPHINEE          3,474,330
           CONDUCTIVITY MEASURING APPARATUS WITH MEANS FOR COMPARING
                         SAMPLED AND REFERENCE VOLTAGES
Filed July 14, 1967                                      2 Sheets-Sheet 1

INVENTOR
THOMAS M. DAUPHINEE
By: Smart & Biggar
ATTORNEYS

Oct. 21, 1969     T. M. DAUPHINEE     3,474,330
CONDUCTIVITY MEASURING APPARATUS WITH MEANS FOR COMPARING
SAMPLED AND REFERENCE VOLTAGES
Filed July 14, 1967     2 Sheets-Sheet 2
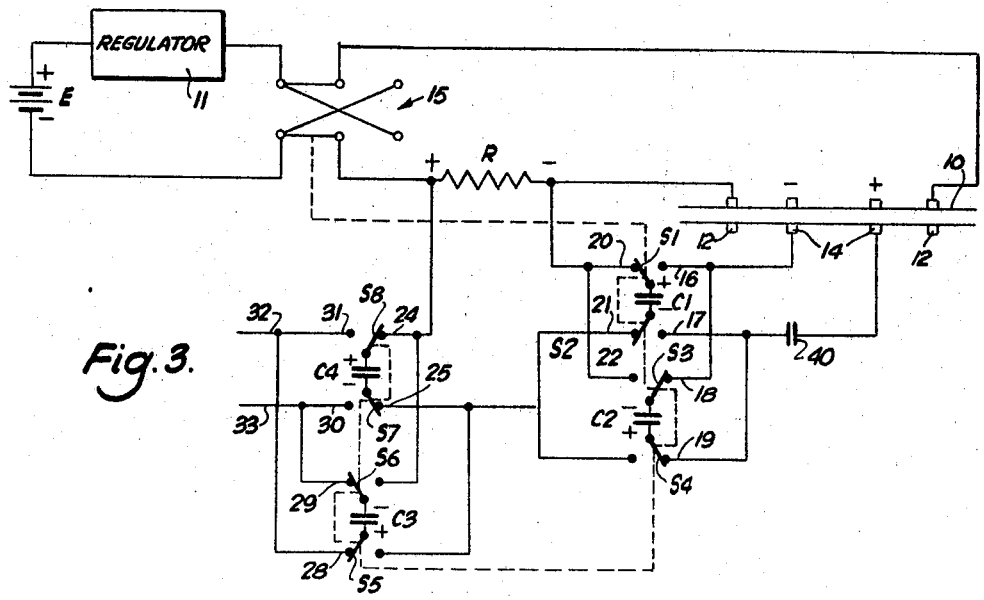
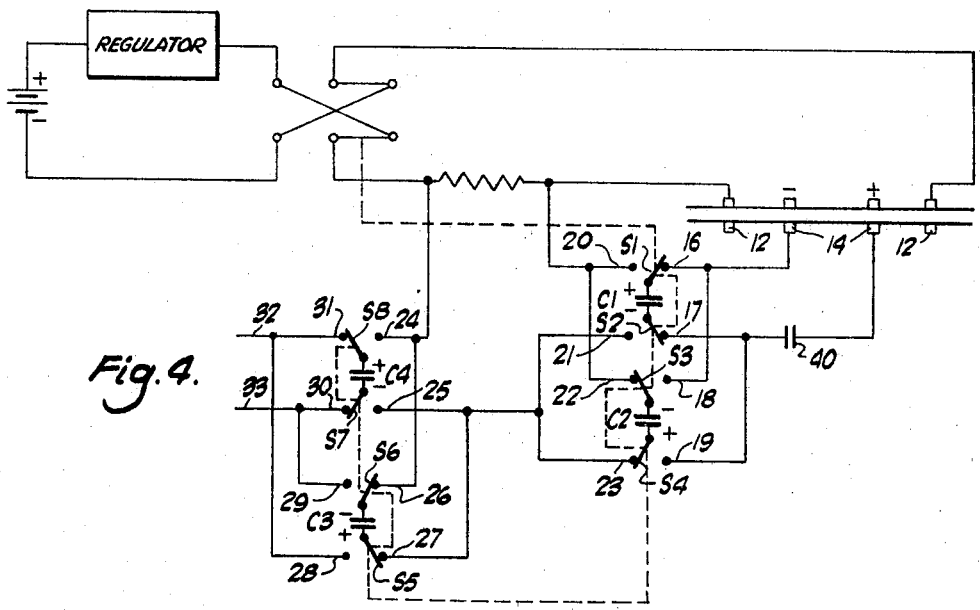
INVENTOR
THOMAS M. DAUPHINEE
By: Smart & Biggar
ATTORNEYS ID # United States Patent Office 3,474,330
Patented Oct. 21, 1969

3,474,330
CONDUCTIVITY MEASURING APPARATUS WITH MEANS FOR COMPARING SAMPLED AND REFERENCE VOLTAGES
Thomas M. Dauphinee, Ottawa, Ontario, Canada, assignor to Canadian Patents and Development Limited, Ottawa, Ontario, Canada, a corporation of Canada
Filed July 14, 1967, Ser. No. 653,427
Int. Cl. G01r 11/44
U.S. Cl. 324—30                                    28 Claims

ABSTRACT OF THE DISCLOSURE

Apparatus for measuring the conductivity of a liquid. A regulated source of DC current is chopped to provide squarewave current which is passed through a cell containing a sample of the liquid. Voltages developed across potential electrodes in the cell are sampled by first and second capacitors alternately connected across them and compared with voltages across a reference resistor. Third and fourth capacitors are alternately connected in series with the reference resistor and with said second and first capacitors, respectively. The voltages of the first and second capacitors and bucked against the voltages developed across the reference resistor so that the third and fourth capacitors, respectively are charged to the resulting difference voltages which provide a measure of the liquid's conductivity.

BACKGROUND OF THE INVENTION

This invention relates to apparatus for measuring the conductivity of a liquid, for example sea water.

The present invention was primarily developed for use in oceanographic surveys but is also useful in other applications where it is desired to know the conductivity of a liquid. In oceanographic surveys, it is frequently desired to chart, inter alia, the salinity of water in various regions and depths. Since salinity is related to conductivity, one can measure the conductivity of water in order to determine its salinity. The apparatus according to the invention, which may be incorporated in an overall system for measuring sea water temperature, pressure and salinity, may be lowered into the sea on the end of a long cable while a recording device remains on board ship and is connected thereto via the cable. The recorder may be designed to record a number of variables such as temperature, pressure and salinity (conductivity) but, for the purposes of the present disclosure, only the recording of salinity need be considered.

Conductivity measurements utilizing DC current are innaccurate because of polarization effects at the electrodes. To avoid this, it is known to use 5–10 kc. alternating current. However, difficulties may be encountered because of phase shifts in the AC system or in accurately regulating such alternating current thereby causing variations in readings which give incorrect conductivity readings. Also, when a long cable is used to connect between the measurement device and a recording device, such as is usually the case in oceaographic work, the high capacitance of the long cable may make it impossible for the output of the measurement device to operate the recording device at the other end of the cable.

SUMMARY OF THE INVENTION

The present invention avoids the above difficulties by using a regulated source of DC current and by electrically isolating the measuring circuitry from the recording circuitry. The DC current is mechanically "chopped" to provide a squarewave comprising positive and negative pulses which are fed to current electrodes of a hollow elongated sampling cell adapted to receive a sample of the liquid of which the conductivity is to be measured. Thus, the sampling cell is supplied with regulated squarewave current which eliminates the effects of polarization at the current electrodes. The DC current, or the squarewave current, feeds a reference resistor. The voltages developed across potential electrodes, disposed intermediate the current electrodes of the sampling cell, are periodically sampled by means of first and second capacitors alternately connected across them. The first and second capacitors are also alternately connected in series with the reference resistor and with third and fourth capacitors so that the third and fourth capacitors are charged to voltages equal to the difference between the voltage across the reference resistor and the voltage between the potential electrodes of the sampling cell. The latter two capacitors are also alternately connected in series with the reference resistor and to the cable leading to the recorder. These latter two capacitors are important in oceanographic applications in that they electrically isolate the measuring circuitry from the recording circuitry. This is important because the sampling cell is grounded to the ocean but the recording device, which may be up to a mile away, is grounded to the ship. Because of polarization and current reversal through the cell the voltage of the measuring circuitry moves up and down with respect to the cable and it would be impossible to transmit this up a long cable. The third and fourth capacitors are alternately connected with like polarity to the output terminals which are thus fed by substantially DC current which is able to be transmitted by the connecting cable to the recording device.

According to the present invention, there is provided apparatus for measuring the conductivity of a liquid comprising: (a) a hollow elongated sampling cell adapted to receive a sample of liquid and having a pair of spaced current electrodes and a pair of spaced potential electrodes intermediate the current electrodes, (b) a source of regulated direct current in series with a reference resistor of predetermined resistance and with said current electrode through a device for periodically reversing the connections of said current electrodes with respect to said source whereby the current through said current electrodes and hence the voltage across the potential electrodes is substantially a squarewave comprising positive and negative pulses, (c) means for sampling the voltage between said potential electrodes during said positive and negative pulses, (d) means for comparing the sampled voltage with the voltage across said reference resistor, and (e) means for determining the difference in voltage between said sampled voltage and the voltage across the reference resistor, which difference in voltage is indicative of the difference of conductivity between the liquid sample and the reference resistor.

BRIEF DESCRIPTION OF THE DRAWINGS

FIGURES 3 and 4 are schematic diagrams showing another embodiment of the invention and showing the alternate switch positions involved.

DESCRIPTION OF THE PREFERRED EMBODIMENTS

Figure 1:
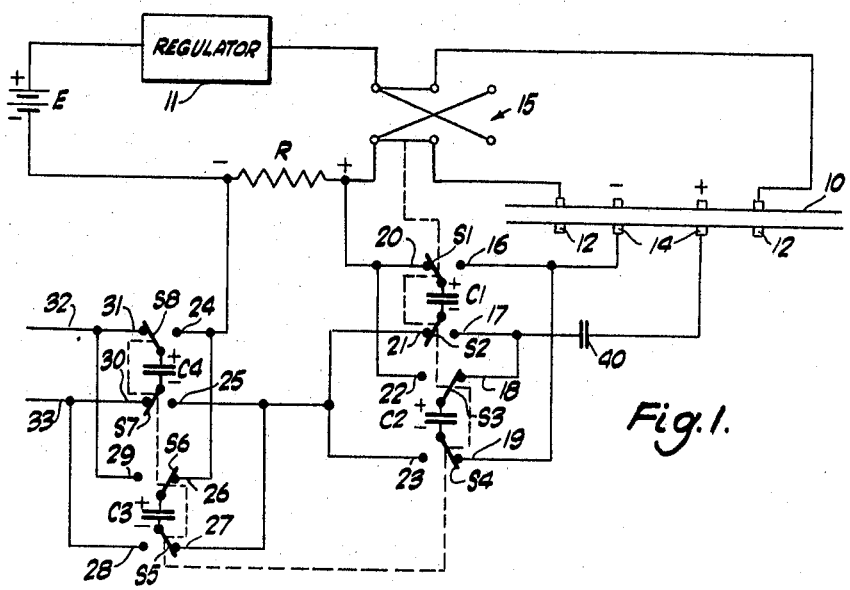
FIGURES 1 and 2 are schematic diagrams of one embodiment of the invention showing the alternate switch positions involved.
Figure 2:
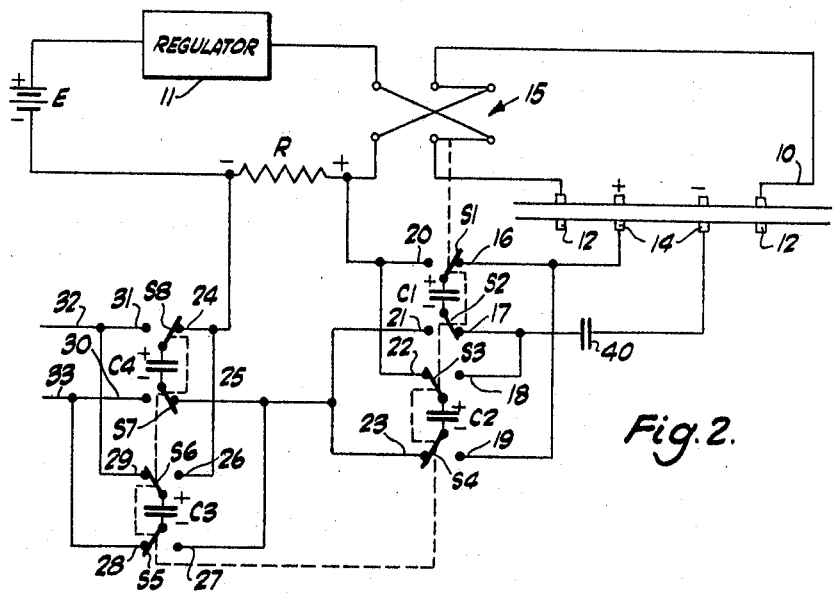

Referring to FIGURES 1 and 2, the apparatus according to one embodiment of the present invention is seen to comprise a hollow elongated sampling cell 10 adapted to receive a sample of liquid and having a pair of spaced current electrodes 12 and a pair of spaced potential electrodes 14 intermediate the current electrodes 12.

A source of regulated direct current which may comprise a battery E and a regulating device 11 is connected in series with a reference resistor R of predetermined resistance and in series with the current electrodes 12 through a device 15 for periodically reversing the connections of the current electrodes 12 with respect to the source of regulated direct current. The device 15 is here illustrated as a simple reversing switch but in practice comprises a mechanical chopper operating at 10–80, preferably 30–40, cycles per second, the exact frequency not being critical. The operating frequency of the chopper does not have to be held to within close limits. By comparing FIGURES 1 and 2, it can be seen that the device 15 connects the current electrodes 12 in first one and then the other polarity with respect to the current source. The potential electrodes 14 thus have a squarewave voltage impressed across them. The reference resistor R, however, is always supplied with current in the same direction, developing a voltage thereacross with the polarity shown in FIGURES 1 and 2. The current through the current electrodes 12 and hence the voltage across the potential electrodes 14 is substantially a squarewave comprising positive and negative pulses. Current flow from right to left in cell 10 (FIG. 1) will herein be considered "positive" while current flow from left to right (FIG. 2) will be considered "negative."

Means are provided for sampling the voltage between the potential electrodes 14 during the positive and negative pulses. This means comprises first and second capacitors C1 and C2 and means for alternately connecting them across potential electrodes 14 during the positive and negative pulses respectively. The means for alternately connecting capacitors C1 and C2 across potential electrodes 14 comprises switch arms S1–S4. Referring to FIGURE 1, during positive pulses, capacitor C2 is connected by switch arms S3 and S4 to contacts 18 and 19 connected to potential electrodes 14. Capacitor C2 thus changes with the polarity shown. During the previous (negative) pulse (FIG. 2), capacitor C1 was connected via switch arms S1 and S2 to contacts 16 and 17 connected to potential electrodes 14. At this time, the polarities of potential electrodes 14 were reversed so that capacitor C1 was charged with the polarity shown in FIGURE 1. This may be seen by examining FIGURE 2 which shows the connections during negative pulses through the sampling cell. Thus capacitors C1 and C2 are alternately connected to potential electrodes 14 and charge with the polarities shown in FIGURES 1 and 2. Switch arms S1 and S2 move simultaneously from contacts 20 and 21 to contacts 16 and 17, respectively. That is, they are "ganged." In fact, switch arms S1–S8 may all be ganged together and also be ganged with the switching device 15. However, in order to prevent voltage transients occurring during switching from charging capacitors C1 and C2, capacitors C1 and C2 should be disconnected from potential electrodes 14 prior to reversing of current flow through the sampling cell 10. This may be readily achieved by various means which will occur to those skilled in the art. If some storage is provided across terminals 24 and 25, and 26 and 27, i.e., a capacitor, the contacts S5, S6, S7, S8 need not be driven synchronously with S1, S2, S3, S4 and in fact can be a triple unit with three capacitors at 120° phase angle.

The means for comparing the sampled voltage with the voltage across reference resistor R comprises means for alternately connecting capacitors C1 and C2 in series with reference resistor R and in series with the third and fourth capacitors C3 and C4, respectively. Referring to FIGURE 1, it can be seen that, during positive pulses through sampling cell 10, capacitor C1 previously charged by negative pulses through cell 10 when it was connected to contacts 16 and 17, is connected via switch arm S1 to contact 20 in series with reference resistor R, contact 26, switch arm S6, capacitor C3, switch arm S5, contact 27 and contact 21, the return connection to C1 being made via contact 21. In FIGURE 1, it has been assumed that the voltage across C1 is greater than that across reference resistor R so that capacitor C3 charges with the polarity shown. Of course, the voltage across C1 may be more than, less than or equal to the voltage across the reference resistor R. A similar assumption was made with respect to FIGURE 2; that is, that the voltage across capacitor C2 was greater than that across reference resistor R so that capacitor C4 charged as shown. Still referring to FIGURE 1, it can be seen that the voltage across C1 bucks the voltage across reference resistor R so that the voltage across C3 is the difference voltage and has the polarity indicated if the above is assumed. Capacitors C3 and C4 are alternately connected to output leads 32 and 33 via contacts 28, 29 and 30, 31 respectively. The voltage on output leads 32 and 33 is DC although, of course, it is pulsating due to the fact that capacitors C3 and C4 are alternately connected by contact arms S5, S6 and S7, S8 to output leads 32 and 33 via switch contacts 28, 29 and 30, 31, respectively.

Capacitors C1 and C2 are preferably connected to the potential electrodes 14 through a blocking capacitor 40 which serves to block DC potentials appearing between the potential electrodes 14 from charging capacitors C1 and C2. Such DC potentials can arise as the result of polarization at the potential electrodes.

Referring to FIGURES 3 and 4, there is shown an alternative embodiment according to the invention wherein the squarewave current flows through the reference resistor R as well as through the sampling cell. This provides elimination of the effects of thermal EMF's in the reference resistor R.

Referring to FIGURE 3, it can be seen that during positive pulses the capacitor C2 is connected across the potential electrodes 14 by means of switch arms S3 and S4 connected to switch contacts 18 and 19. During the previous negative pulse, the connections were as shown in FIGURE 4 and it can be seen that capacitor C1 was charged as shown by virtue of its switch arms S1 and S2 being connected to switch contacts 16 and 17 across the potential electrodes 14. Referring back to FIGURE 3, it can be seen that, in this connection of the various switch contacts, capacitor C1 has its switch arms S1 and S2 connected to contacts 20 and 21 while capacitor C4 has its switch arms S7 and S8 connected to contacts 25 and 24, respectively. Thus, capacitor C1 is connected in series with reference resistor R so that its voltage opposes that across reference resistor R. Assuming again that the voltage across capacitor C1 is greater than the voltage drop across resistor R, it can be seen that capacitor C4 will charge with the polarity indicated in FIGURE 3. Capacitor C4 will thus charge to a voltage equal to the difference in voltage between the voltage across capacitor C1 and that across reference resistor R. When the various switch contacts change over to the positions shown in FIGURE 4, capacitor C4 will have its switch arms S7 and S8 connected to contacts 30 and 31 connected to output leads 33 and 32, respectively. The difference voltage across capacitor C4 is thus transmitted over leads 32 and 33 to a suitable recording device. During positive pulses (FIGURE 3) capacitor C3 has its switch arms S5 and S6 connected to contacts 28 and 29, respectively which in turn, are connected to output leads 32 and 33. In both FIGURES 3 and 4, it has been assumed that the voltage across capacitor C1 or capacitor C2 is greater than that across the reference resistor R and hence that capacitors C3 and C4 charge to the polarities indicated on FIGURES 3 and 4. It will be noted that capacitors C3 and C4 are connected to the output leads with like polarities so that the output leads are supplied with pulsating DC current which is able to be transmitted without attenuation by the connecting cable to the recording device.

The various switch arms are preferably ganged for substantially simultaneous operation and are also ganged to the current reversal device although, for the reasons given previously in connection with FIGURES 1 and 2, the current reversing device 15 does not operate until the switch arms S1–S8 have broken contact with whichever terminals they are in contact with. Of course, the current reversal device 15 operates before the switch arms S1–S8 change over completely.

A blocking capacitor 40 is provided for the reason explained in connection with the embodiment shown in FIGURES 1 and 2.

What I claim is:

1. Apparatus for measuring the conductivity of a liquid comprising:
   a hollow elongated sampling cell adapted to receive a sample of said liquid and having a pair of spaced current electrodes and a pair of spaced potential electrodes intermediate said current electrodes;
   a source of regulated direct current in series with a reference resistor of predetermined resistance and with said current electrodes through a device for periodically reversing the connections of said current electrodes with respect to said source whereby the current through said current electrodes and hence the voltage across the potential electrodes is substantially a squarewave comprising positive and negative pulses;
   means for sampling the voltage between said potential electrodes during said positive and negative pulses;
   means for comparing the sampled voltage with the voltage across said reference resistor; and
   means for determining the difference in voltage between said sampled voltage and the voltage across the reference resistor, which difference in voltage is indicative of the difference of conductivity between the liquid sample and the reference resistor.

2. Apparatus as claimed in claim 1 wherein said means for sampling the voltage between said potential electrodes comprises first and second capacitors and means for alternately connecting them across said potential electrodes during said positive and negative pulses respectively.

3. Apparatus as claimed in claim 2 wherein said means for comparing the sampled voltage with the voltage across said reference resistor comprises means for alternately connecting said first and second capacitors in series with said reference resistor and in series with third and fourth capacitors respectively, each said first and second capacitor being connected so that its voltage opposes the voltage across the reference resistor, whereby said third and fourth capacitors have voltages developed across them substantially equal to the difference in voltage between that across said reference resistor and that across said first and second capacitors respectively.

4. Apparatus as claimed in claim 3 wherein said means for determining the difference in voltage between said sampled voltage and the voltage across said reference resistor comprises means for alternately connecting said third and fourth capacitors with like polarities across a pair of output leads, said leads being connected to a voltage measuring device.

5. Apparatus as claimed in claim 4 wherein said voltage measuring device includes means for recording variations in voltage across said output leads.

6. Apparatus as claimed in claim 4 wherein, during said positive pulses, said second capacitor is connected across said potential electrodes, said first capacitor is connected in series with said reference resistor and with said third capacitor and said fourth capacitor is connected across said output leads; and during said negative pulses said first capacitor is connected across said potential electrodes, said second capacitor is connected in series with said reference resistor and with said fourth capacitor and said third capacitor is connected across said output leads.

7. Apparatus as claimed in claim 6 including means for synchronously changing the connections of said four capacitors between positive and negative pulses.

8. Apparatus as claimed in claim 7 wherein said device for periodically reversing the connections of said current electrodes is synchronized with said means for synchronously changing the connections of said four capacitors.

9. Apparatus as claimed in claim 8 wherein said device for periodically reversing the connections of said current electrodes is actuated during time intervals when the connections of said first and second capacitors are intermediate the positions they have during said positive and negative pulses respectively whereby said first and second capacitors are not charged by transients occurring during switching of said device for periodically reversing the connections of said current electrodes.

10. Apparatus as claimed in claim 9 including a blocking capacitor adapted to be connected between said potential electrodes and said first and second capacitors, said blocking capacitor serving to block DC potentials appearing between the potential electrodes from charging said first and second capacitors.

11. Apparatus as claimed 1 wherein said device for periodically reversing the connections of said current electrodes with respect to said source also reverses the connections of said reference resistor with respect to said source.

12. Apparatus as claimed in claim 11 wherein said means for sampling the voltage between said potential electrodes comprises first and second capacitors and means for alternately connecting them across said potential electrodes during said positive and negative pulses respectively.

13. Apparatus as claimed in claim 12 wherein said means for comparing the sampled voltage with the voltage across said reference resistor comprises means for alternately connecting said first and second capacitors in series with said reference resistor and in series with said fourth and third capacitors, respectively, each said first and second capacitor being connected so that its voltage opposes the voltage across the reference resistor whereby said third and fourth capacitors have voltages developed across them substantially equal to the difference in voltage between that across said reference resistor and that across said first and second capacitors respectively.

14. Apparatus as claimed in claim 13 wherein said means for determining the difference in voltage between said sampled voltage and the voltage across said reference resistor comprises means for alternately connecting said third and fourth capacitors with like polarities across a pair of output leads, said leads being connected to a voltage measuring device.

15. Apparatus as claimed in claim 14 wherein said voltage measuring device includes means for recording variations in voltage across said output leads.

16. Apparatus as claimed in claim 14 wherein, during said positive pulses, said second capacitor is connected across said potential electrodes, said first capacitor is connected in series with said reference resistor and with said fourth capacitor and said third capacitor is connected across said output leads; and during said negative pulses said first capacitor is connected across said potential electrodes, said second capacitor is connected in series with said reference resistor and with said third capacitor and said fourth capacitor is connected across said output leads.

17. Apparatus as claimed in claim 16 including means for synchronously changing the connections of said four capacitors between said positive and negative pulses.

18. Apparatus as claimed in claim 17 wherein said device for periodically reversing the connections of said current electrodes is synchronized with said means for synchronously changing the connections of said four capacitors.

19. Apparatus as claimed in claim 18 wherein said device for periodically reversing the connections of said current electrodes is actuated during time intervals when the connections of said first and second capacitors are intermediate the positions they have during said positive and negative pulses respectively whereby said first and second capacitor are not charged by transients occurring during switching of said device for periodically reversing the connections of said current electrodes.

20. Apparatus as claimed in claim 19 including a blocking capactor adapted to be connected between said potential electrodes and said first and second capacitors, said blocking capacitor serving to block DC potentials appearing between the potential electrodes from charging said first and second capacitors.

21. Apparatus as claimed in claim 1 wherein the device for periodically reversing the connections of said current electrodes and the means for sampling the voltage between the potential electrodes operate at a frequency of the order of 40 cycles per second.

22. Apparatus as claimed in claim 11 wherein the device for periodically reversing the connections of said current electrodes and the means for sampling the voltage between the potential electordes operate at a frequency of the order of 40 cycles per second.

23. Apparatus as claimed in claim 4 wherein the device for periodically reversing the connections of said current electrodes and the means for sampling the voltage between the potential electrodes operate at a frequency of the order of 40 cycles per second.

24. Apparatus as claimed in claim 14 wherein the device for periodically reversing the connections of said current electrodes and the means for sampling the voltage between the potential electrodes operate at a frequency of the order of 40 cycles per second.

25. Apparatus as claimed in claim 2 including a blocking capacitor adapted to be connected between said potential electrodes and said first and second capacitors, said blocking capacitor serving to block DC potentials appearing between the potential electrodes from charging said first and second capacitors.

26. Apparatus as claimed in claim 6 including a blocking capacitor adapted to be connected between said potential electrodes and said first and second capacitors, said blocking capacitor serving the block DC potentials appearing between the potential electrodes from charging said first and second capacitors.

27. Apparatus as claimed in claim 12 including a blocking capacitor adapted to be connected between said potential electrodes and said first second capacitors, said blocking capacitor serving to block DC potentials appearing between the potential electrodes from charging said first and second capacitors.

28. Apparatus as claimed in claim 16 including a blocking capacitor adapted to be connected between said potential electrodes and said first and second capacitors, said blocking capacitor serving to block DC potentials appearing between the potential electrodes from charging said first and second capacitors.

References Cited

UNITED STATES PATENTS

| | | | |
|---|---|---|---|
| 1,346,057 | 7/1920 | Reardon | 324—30 |
| 2,871,445 | 1/1959 | Carter et al. | 324—30 |
| 2,871,446 | 1/1959 | Wann | 324—64 |

RUDOLPH V. ROLINEC, Primary Examiner

C. F. ROBERTS, Assistant Examiner

U.S. Cl. X.R.

324—64